Nov. 11, 1969    J. MARTIN    3,477,837
CLEAN-OUT DOORS FOR VERTICAL DRAW SHEET
GLASS MAKING APPARATUS
Filed May 13, 1965    3 Sheets-Sheet 3

INVENTOR
JOHN MARTIN

BY

ATTORNEYS

United States Patent Office 3,477,837
Patented Nov. 11, 1969

3,477,837
CLEAN-OUT DOORS FOR VERTICAL DRAW SHEET GLASS MAKING APPARATUS
John Martin, Monterrey, Nuevo Leon, Mexico, assignor to Fabricacion de Mequinas, S.A., Monterrey, Mexico, a corporation of Mexico
Filed May 13, 1965, Ser. No. 455,370
Int. Cl. C03b 15/02
U.S. Cl. 65—168          1 Claim

ABSTRACT OF THE DISCLOSURE

A vertical draw sheet glass forming machine is provided with a series of clean-out openings in the vertical side walls of the machine which parallel the glass sheet. Each opening is closed by a plurality of door members each of which is hermetically sealed to the side wall of the machine and each door member may be opened independently of the others and resealed to minimize cold drafts due to chimney effect in the machine.

---

The present invention relates to glass making machines of the vertical draw type and more particularly to door means for sealing the clean-out openings in the side walls of such machines.

In vertical draw sheet glass making machines, the glass sheet passes vertically upwardly through a plurality of pairs of roll members. A conventional machine of this type includes approximately thirty pairs of rolls which are uniformly spaced from the bottom to the top of the machine, such machines generally being of the order of fifty feet in height. Positioned interiorly of the side walls of the machine and extending inwardly toward the moving glass sheet from opposite side walls are a plurality of deflector members which are intended to perform, among other functions, the function of deflecting broken glass particles away from the moving glass sheet and to the side of the machine. Such particles would otherwise tend to lodge in between the sheet and the rolls and would accumulate there until removed by some physical manipulation. It is conventional in machines of this type to employ such deflectors and further to provide openings through the side wall of the machine which openings extend upwardly from the base of the deflector members. Normally, such openings must be hermetically sealed during the operation of the machine in order to prevent drafts due to the chimney or stack effect which drafts would be very deleterious to the quality of the glass sheet being manufactured. The means for closing these openings must be such that they may be swung to an open position to permit cleaning out of accumulated glass particles and they must then be reclosed and hermetically sealed against the side wall of the machine.

It is the principal object of the present invention to provide door structures for this purpose.

A further object is to provide clean-out doors for vertical draw sheet glass making machines which may be positively hermetically sealed completely around the clean-out openings.

Other objects it will be apparent to those skilled in the art from a consideration of the following detailed description read in conjunction with the attached sheets of drawings in which.

In general, the objects of the present invention are achieved by providing a clamping and hinge structure for the clean-out door which permits the door to be swung to a fully open position and which further permits the door to be positively hermetically sealed by a series of clamping bolts arranged around the periphery of each door and which bolts threadedly engage corresponding openings arranged in the side walls of the machine around the clean-out opening. In order that the clamping means be effective, it is necessary that the hinge structure on which the door is pivoted be such that in the closed position of the door the hinged edge is nevertheless capable of at least a limited movement in a plane perpendicular to the side wall of the machine.

Figure 1:
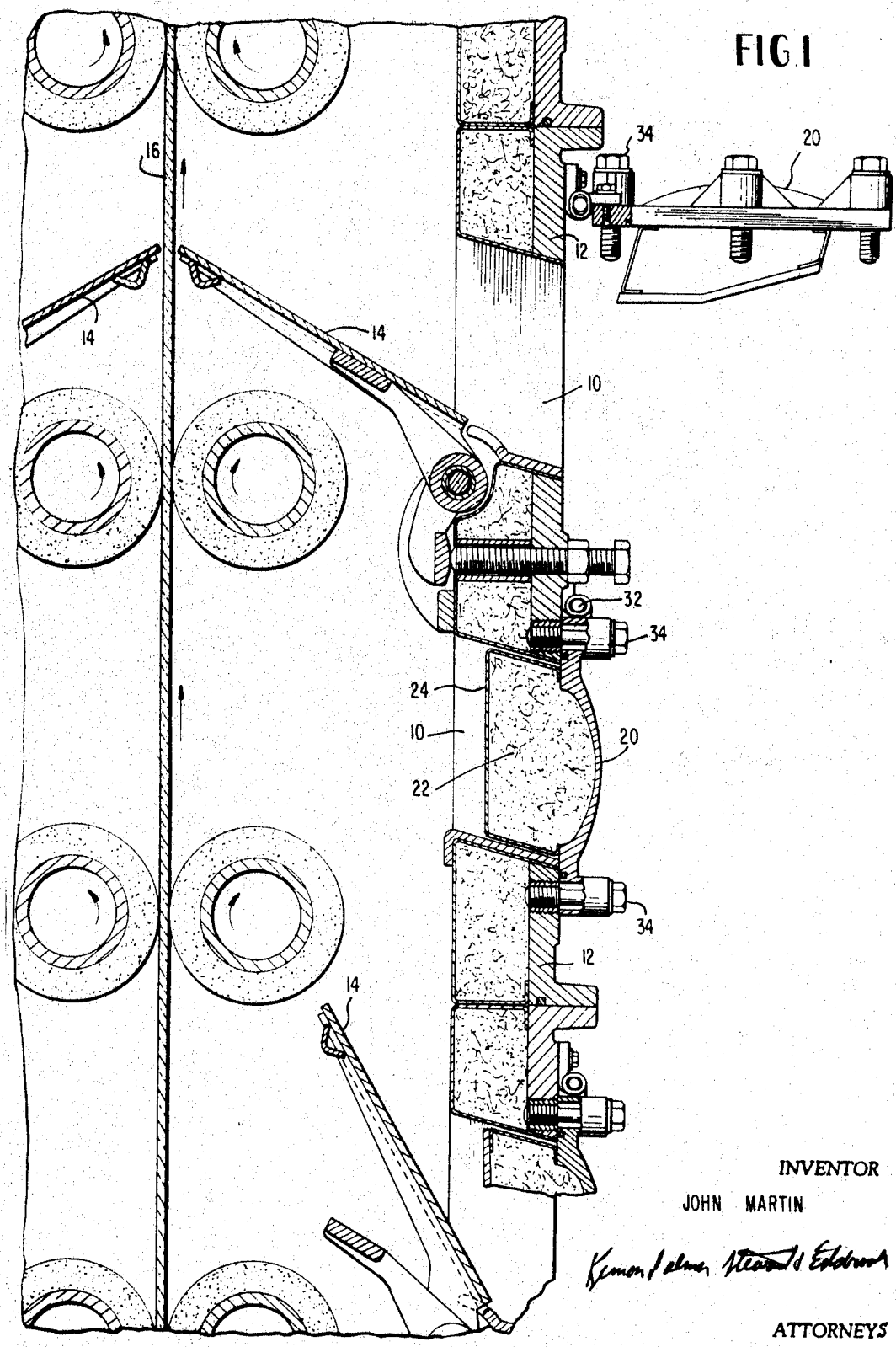
FIGURE 1 is a partial side view in section of two sections of a vertical sheet glass making machine having the doors of the present invention applied thereto.

Referring now to the drawings for a detailed description of the present invention, it will be seen in FIGURE 1 that the machine is built of a number of identical sections joined together in hermetically sealed relationship and each section includes two clean-out openings 10 extending through the side wall 12 of the machine. Baffles or deflector members 14 extend inwardly toward the glass sheet 16 from the side walls 12. The deflector members 14 are inclined at an angle such that glass fragments are deflected generally downwardly and outwardly away from the upwardly moving glass sheet 16 and toward the clean-out openings 10.

Hingedly supported above each clean-out opening 10 is a door member 20. As a practical matter, the clean-out openings 10 extend substantially the full width of the side walls of the machine and it is preferable to have more than one door to cover the opening. Usually, three doors of equal size are hung over each opening in end to end alignment. As shown most clearly in FIGURE 1, the side walls of the machine are insulated and each door member also carries a thick layer of insulating material 22 which is contained between the inner surface of the door 20 and a metallic shield member 24. The shield 24 must be of sufficient strength to take the shock of falling glass particles which may, in the case of a door in the lower portion of the machine, have fallen a very considerable distance and therefore strike the surface 24 with considerable force.

Figure 2:
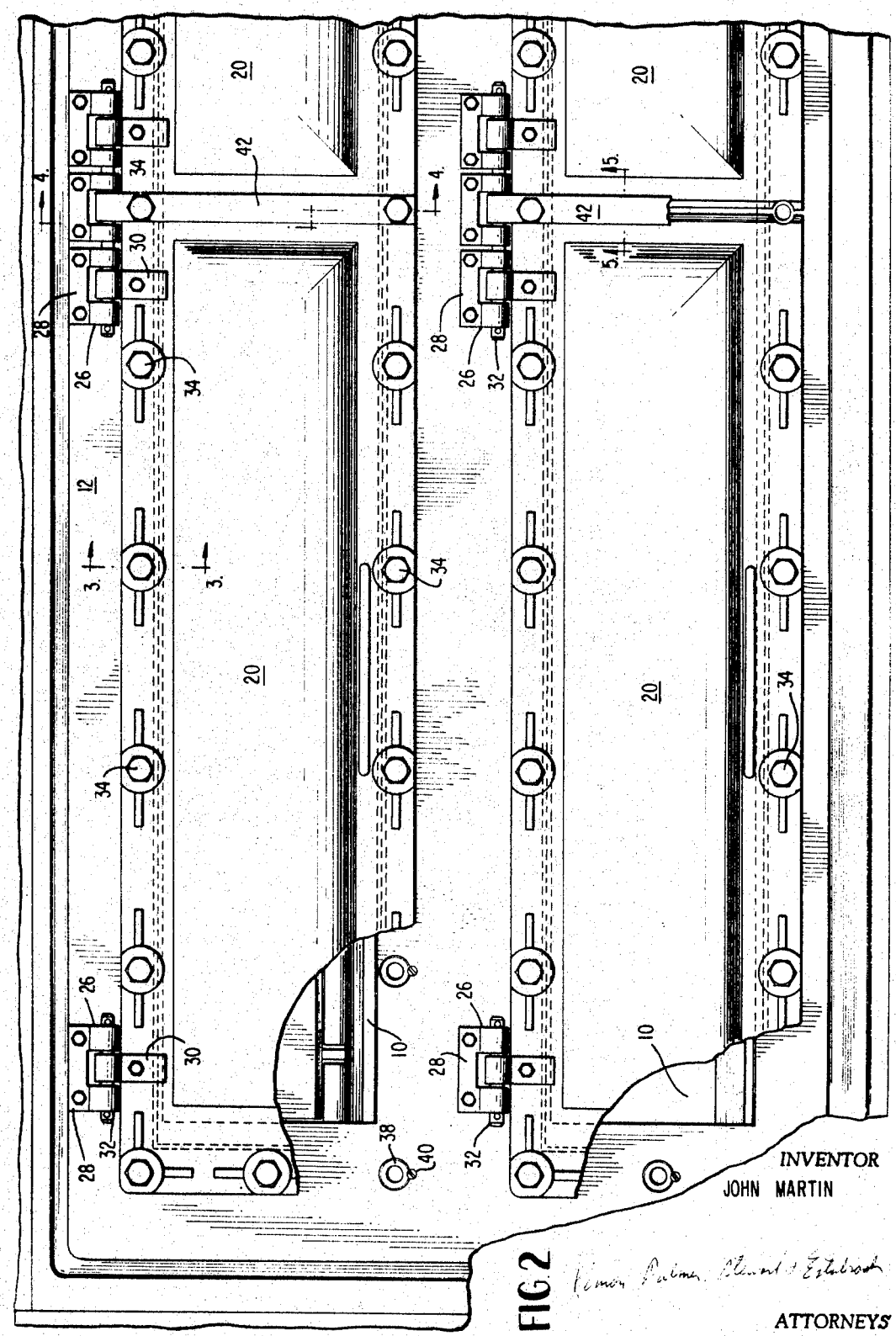
FIGURE 2 is a plan view of a portion of the side wall of a machine, the vertical extent of which is approximately the same as that shown in FIGURE 1.
Figure 3:
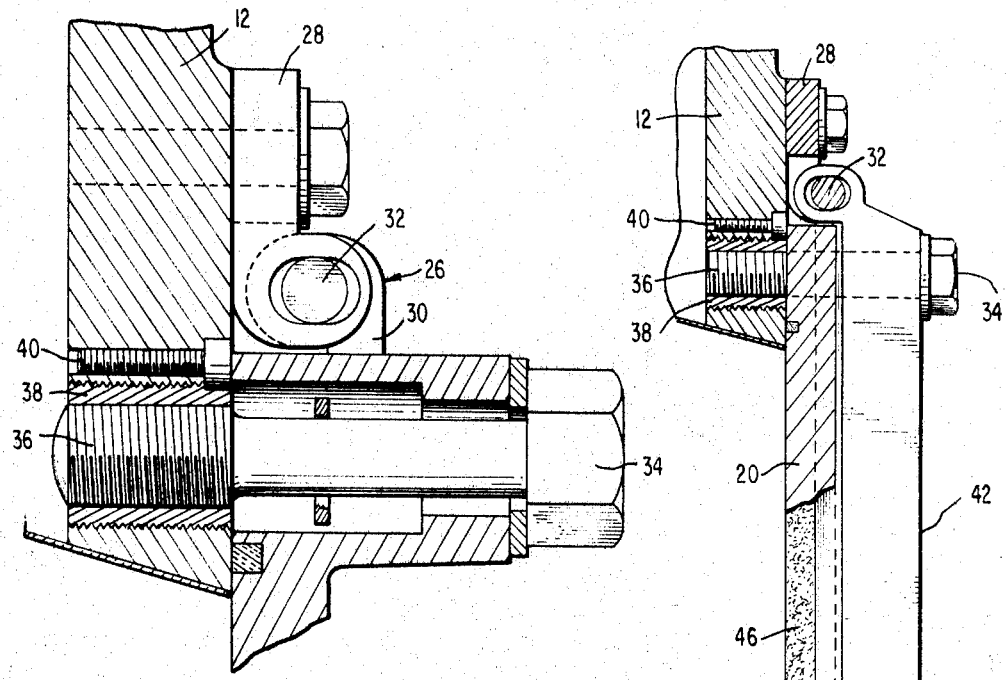
FIGURE 3 is a section on the lines 3—3 of FIGURE 2.
Figure 4:
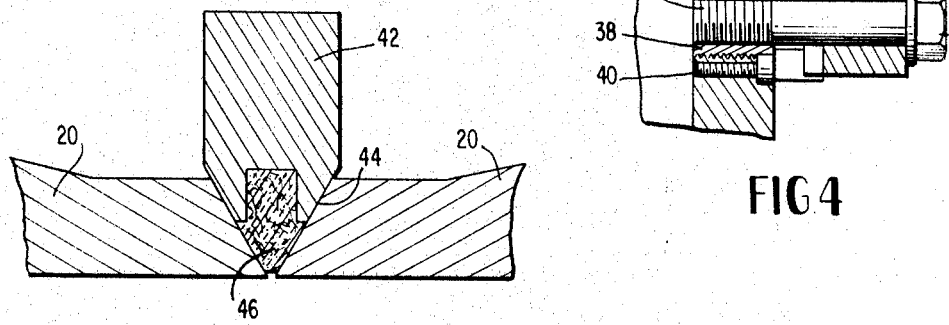
FIGURE 4 is a view on the lines 4—4 of FIGURE 2.

Turning now to FIGURE 2, two entire doors plus portions of two doors adjoining thereto are shown in plan view. Each door is supported by its upper edge over the clean-out opening by a pair of spaced hinges 26. The particular structure of these hinges is important to an understanding of the present invention and FIGURES 2, 3 and 4 are most helpful in disclosing the particular hinge structure in accordance with the present invention. Each hinge includes a pair of leaves 28 and 30, the leaf 30 being attached to the upper edge of the door 20 and the leaf 28 being rigidly attached to the side frame 12 of the machine. A pintle 32 interconnects the two leaves 28 and 30. As shown most clearly in FIGURE 3, the pintle openings in the leaves 28 and 30 are such that they receive the pintle with a relatively close fit in one direction but with a very loose fit in a direction transverse to the direction of the snug fit. In the closed position of the door, the direction of loose fit is in a plane which is perpendicular to the wall 12 of the machine. The net result is that the door 20 is always properly aligned vertically over the opening 10 but by virtue of the loose fit in the hinges is free to move by a predetermined amount in a plane perpendicular to the wall 12 of the machine.

A plurality of bolts 34 are distributed around the outer edge of each door 20 and are used to clamp the door in hermetically sealed relation with the wall 12 surrounding the clean-out opening 10. The inner end of each bolt 34 is threaded as shown at 36 in FIGURE 3 in order to threadedly engage an insert 38 which in turn is threadedly engaged with an opening in the side wall 12 of the machine. The purpose of the insert which is preferably of copper, is to prevent binding or galling of the bolt in the frame 12 at the high temperatures to which these bolts are subjected. In the event that an insert 38 becomes worn, it may easily be replaced. For that purpose a small bolt 40 or set screw is used to hold the insert in the position shown in FIGURE 3.

Figure 5:
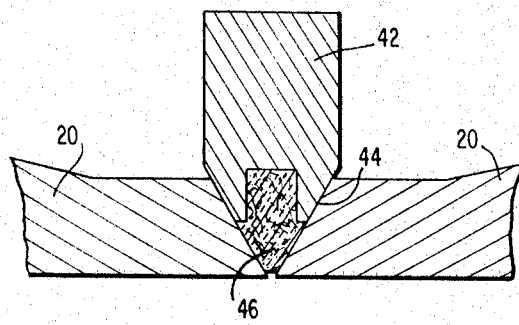
FIGURE 5 is a sectional view on the lines 5—5 of FIGURE 2.

Referring now to FIGURES 2, 4 and 5 of the attached drawings, it is necessary to provide an additional hermetic sealing means between the adjacent edges of adjacent doors 20 and such means are shown in these figures as a very narrow door member 42. As appears most clearly in FIGURE 5, adjacent edges of the doors 20 are chamfered as shown at 44 and the inner edges of the narrow doors 42 have a corresponding taper to mate with the adjoining door edge portions. Additionally, a packing material 46 may be employed at the inner end of the narrow doors 42.

Each narrow door 42 is suspended to the side wall 12 of the machine in exactly the same manner as the doors 20, that is to say the hinge structure is identical and permits the movement of the door perpendicularly to the side wall 12 of the machine when the door is in closed position. Also, the narrow doors 42 are clamped to the outer surface of the adjacent doors 20 by means of bolts 34 which may be identical to the ones used for the main doors.

For convenience, and as shown most clearly in FIGURE 2, the hinge members where three doors come together as shown at the right hand side of FIGURE 2 may have a common pintle.

With the door structures as shown and described, it will be apparent that one or all of the doors across a given clean-out opening 10 may be opened at the same time. It will be further apparent that with the type of hinge structure utilized for supporting the doors over the clean-out openings, it will be possible to re-effect a hermetic seal between the doors and the side frame of the machines each time the door is opened and reclosed.

I claim:
1. In combination with a vertical draw sheet glass forming machine having end and side walls and elongated clean-out openings in the sidewalls thereof, hermetic seal means for said side wall openings each seal means comprising:
- (1) a plurality of door members aligned in their closed position covering each of said openings;
- (2) hinges swingably supporting each door by its upper edge over said openings, each of said hinges having pintle openings in the leaves thereof of greater transverse dimensio nthan the diameter of the pintle to permit movement of each door in its closed position toward and away from said machine;
- (3) clamping means for positively hermetically sealing each door to said machine over said opening; and
- (4) hermetic sealing means overlying the adjoining edges between adjacent doors which includes a narrow strip door member supported on said machine in the same manner as said doors and having clamping means for positively sealing said strip door member to adjacent doors.

References Cited
UNITED STATES PATENTS

| | | | |
|---|---|---|---|
| 1,882,262 | 10/1932 | Spinasse | 65—90 |
| 2,156,635 | 5/1939 | Mascuch et al. | 114—117 |
| 3,165,391 | 1/1965 | Schmid | 65—168 |
| 3,326,657 | 6/1967 | Brady | 65—193 |

FOREIGN PATENTS

| | | |
|---|---|---|
| 167,521 | 8/1921 | Great Britain. |
| 480,780 | 2/1938 | Great Britain. |

S. LEON BASHORE, Primary Examiner

E. R. FREEDMAN, Assistant Examiner

U.S. Cl. X.R.

65—88, 159, 196